United States Patent [19]
Vargo

[11] 3,818,789
[45] June 25, 1974

[54] METHOD FOR PUNCHING RUBBERIZED WIRE REINFORCED SHEET MATERIAL

[76] Inventor: William J. Vargo, 1631 Huguelet St., Akron, Ohio 44305

[22] Filed: Aug. 25, 1971

[21] Appl. No.: 174,725

[52] U.S. Cl............... 83/18, 83/175, 83/687, 83/251, 83/689
[51] Int. Cl............... B23b 3/28, B26f 1/14
[58] Field of Search........... 83/17, 18, 49, 175, 176, 83/686, 689, 687

[56] References Cited
UNITED STATES PATENTS

| | | | |
|---|---|---|---|
| 3,130,885 | 4/1964 | Fleming | 83/689 X |
| 3,170,349 | 2/1965 | Weinkle | 83/175 X |
| 3,461,761 | 8/1969 | Mojonnier | 83/17 X |
| 3,656,379 | 4/1972 | Clark | 83/686 X |

FOREIGN PATENTS OR APPLICATIONS

| | | | |
|---|---|---|---|
| 592,179 | 7/1925 | France | 83/689 |

Primary Examiner—Andrew R. Juhasz
Assistant Examiner—Leon Gilden
Attorney, Agent, or Firm—Oldham & Oldham Co.

[57] ABSTRACT

The invention relates to a method for effectively and precisely cutting holes into wire reinforced rubber sheets or webs. Essentially, the technique is achieved by stretching the sheet so that the wires and rubber therein are under tension, providing means to effect a shearing cutting action progressively from substantially opposed points towards each other by punching a cutter through the sheet with a slow powerful stroke, while simultaneously supporting the sheet around the periphery of the hole punched. With the sheet and wires therein under tension during this punch shear cut, a highly precise hole is formed thereby overcoming the natural tendency of the rubber to buckle and sway and cause a jagged irregular cut.

3 Claims, 11 Drawing Figures

INVENTOR.
WILLIAM J. VARGO

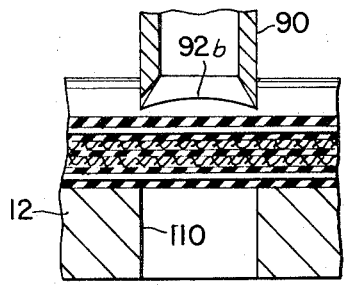

FIG. 6

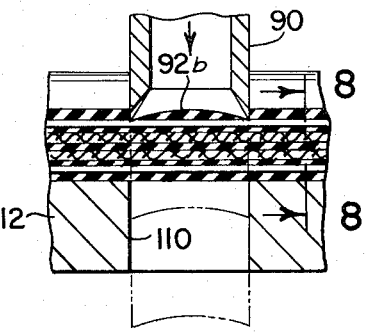

FIG. 7

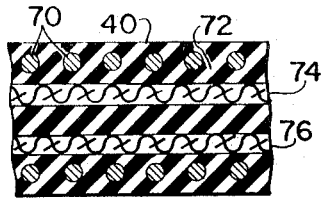

FIG. 8

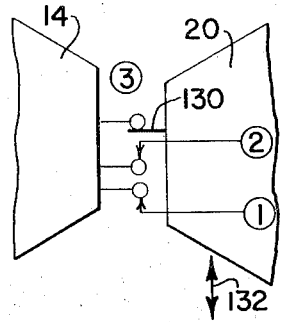

FIG. 10

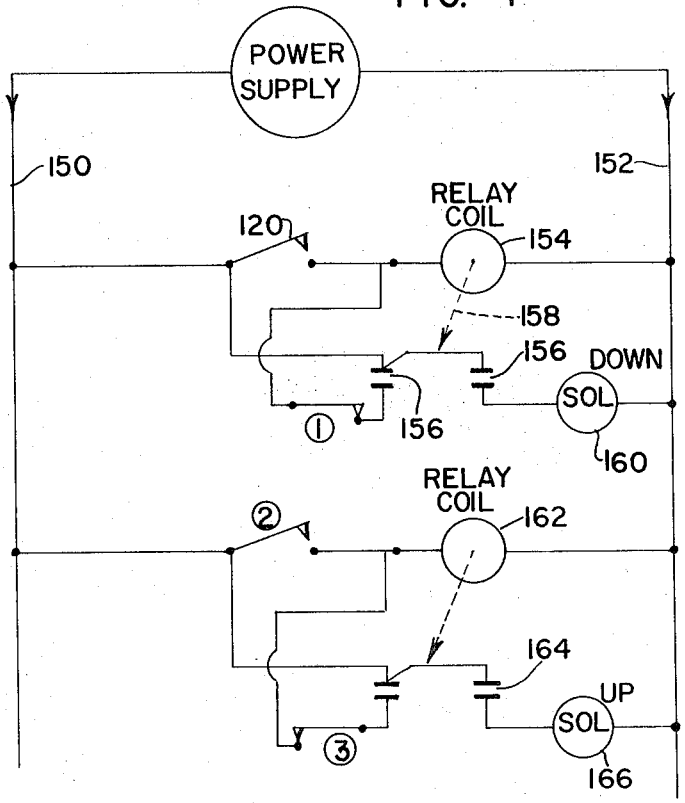

FIG. 9

```
┌─────────────────────────────────────┐
│  STRETCH WIRE REINFORCED RUBBER BELT │
└─────────────────────────────────────┘
                 ▼
┌─────────────────────────────────────┐
│      PUNCH CUT HOLE WITH SLOW       │
│     EVEN POWER STROKE STARTING      │
│    CUT AT OPPOSED PARTS OF HOLE     │
│    AND WORKING TOWARD EACH OTHER    │
│         WITH SHEARING ACTION        │
└─────────────────────────────────────┘
                 ▼
┌─────────────────────────────────────┐
│    SUPPORT AROUND OUTER PERIPHERY   │
│       OF HOLE DURING PUNCH CUT      │
└─────────────────────────────────────┘
                 ▼
        ┌──────────────────┐
        │   REMOVE PUNCH   │
        └──────────────────┘
```

FIG. 11

METHOD FOR PUNCHING RUBBERIZED WIRE REINFORCED SHEET MATERIAL

PRIOR ART

Heretofore it has been known that punching machines for forming holes in metal or rubber have been well known in the state of the art. However, heretofore the problems encountered in punching precise and smooth holes through a relatively thick wire reinforced sheet has presented certain problems. For example, the process is similar to trying to precisely cut a wire in a suspended condition, because the wire is in effect suspended in the rubber sheet, and hence it cannot be layed against or cut against some hard and fixed backing. Further, when cutting through relatively hard rubber similar to the type used in automobile tires, conveyor belts, or or the like, of thickness of for example equal to or greater than 1/4 inch, the problems encountered in forming a clean and precisely located hole with smooth edges has been considerable because of the tendency of the rubber to bulge, sway, and resiliently deform during the punching or cutting operation. Prior art attempts to combine a precision punching where the rubber is reinforced with some type of longitudinally extending wire or even a wire mesh of some type has been an extremely difficult problem to solve. It is not known that any suitable solutions to this punching problem for a wire reinforced thick rubber sheet have been perfected.

Therefore, it is the general object of the present invention to provide an apparatus and method to effectively punch substantially precision holes with a relatively clean configuration through a wire reinforced rubber sheet by utilizing substantially conventional punch apparatus, but is accomplished by holding a sheet under tension during the punch and effecting the punch with a progressive shearing action as it passes through the rubber sheet to minimize bunching and rubber deformation.

A further object of the invention is to provide a unique method to achieve precise alignment between successive holes punched into a rubber sheet where alignment is absolutely necessary so that the sheet might cooperate with some external members such as a sprocket for example.

A further object of the invention is to provide a metho for punching a precisely aligned hole in a rubber sheet where the sheet is under tension during the punch, and which includes providing a particular shearing cutting action during the punch to give precise alignment and smooth edges to the holes punched.

A further object of the invention is to provide a method and apparatus for providing punched holes in wire reinforced rubber endless belts for snow mobile tracks wherein the alignment of the holes is critical to allow a sprocket drive of the belt in association with the snow mobile.

A further object of the invention is to allow the method to function with any type of wire or metallic reinforced relatively thick rubber sheeting or belting material so that precision holes of any selected shape can be formed in this sheet or belt structure. Essentially, the invention contemplates that the rubber material will have a thickness of greater than one-eighth inch, and that the wire reinforcement will run in the direction of a tensional loading of the material.

The aforesaid objects of the invention and other objects which will appear obvious as the description procceds are achieved in the apparatus of the invention which comprises a frame, a punch bed supported by the frame, means to stretch a wire reinforced rubber sheet in aligned relation over the punch bed so the wire in the sheet and the sheet itself are under tension, a cutter punch supported by the frame in movable relation to the bed, the cutter punch defining a cutting edge designed to contact said sheet at at least two points and affect a shearing action in the sheet of said points towards each other as the punch moves through the sheet, means to force the punch through the sheet in a slow powerful stroke, and means to support the sheet around the periphery of the hole cut by the punch during the punching operation.

The method of the invention is achieved by stretching a wire reinforced rubber sheet in sufficient amount to hold the wires in tension, punching a cutting tool through the sheet with a high pressure in a relatively slow speed, effecting the cutting through the sheet during the punching of the cutting tool by a shearing action caused by beginning the cutting at at least two points and progressively working towards each other, and supporting the sheet around the periphery of the hole during the punching of the tool therethrough.

BRIEF DESCRIPTION OF THE DRAWINGS

For a better understanding of the invention reference should be made to the accompanying drawings wherein

FIGS. 6 and 7 illustrate the relation of the cutter to the belt as punching takes place, and showing the shearing cutting action which occurs;

FIG. 8 is an enlarged cross sectional view of a particular wire reinforced rubber sheet;

FIG. 9 is a schematic electrical diagram of the control utilized with the embodiment of the invention of FIG. 1;

FIG. 10 is a schematic illustration of the electrical switches associated between the frame and the movable head; and FIG. 11 is a flow diagram illustrating the method steps accomplished in the punching operation of the invention.

DESCRIPTION OF THE INVENTION

Now, with reference to the drawings, only a preferred embodiment of the invention is described in accordance with the Patent Statutes, but it is to be understood that the broad idea of the invention is applicable to punching holes through any wire or metallic reinforced rubber sheet of some thickness where the wires tend to act like they are in a suspended condition and the rubber tends to bunch up or flow during the punching operation.

Figure 1:
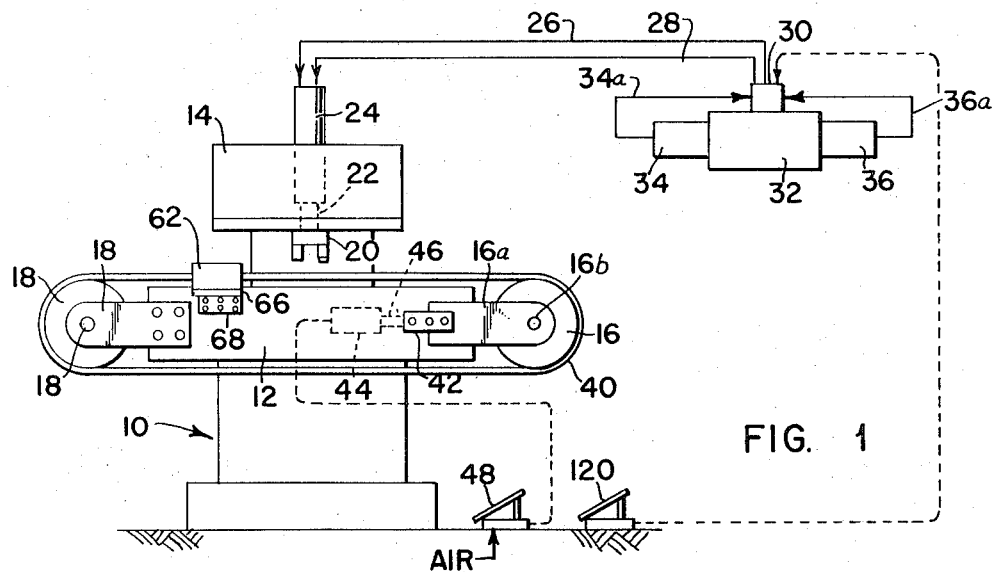
FIG. 1 is a front elevation in partial schematic showing a preferred embodiment of the invention adapted to work on an endless wire reinforced rubber belt.

Hence, with reference to FIG. 1, the numeral 10 illustrates generally a frame which carries in cantelever fashion a support or punch bed 12 and a punch guide head 14. A pair of rolls 16 and 18 are rotatably mounted to the punch bed 12 by appropriate arms 16a and 18a, respectfully, and rotatable pins 16b and 18b.

A cutter punch indicated generally by numeral 20 is slideably carried with respect to the head 14 and mounted directly to a ram 22 actuated by an appropriate hydraulic powered cylinder 24. The cylinder 24 is of the type that can receive 2 hydraulic inputs over appropriate lines 26 and 28 with one input providing an up movement of the cylinder and the other providing a down movement. The hydraulic lines emanate from an appropriate directional control valve 30 which cooperates with a dual hydraulic pump 32 having a high pressure end 34 and a low pressure end 36 with appropriate outputs to valve 30 over line 34a and 36a respectfully.

Figure 2:
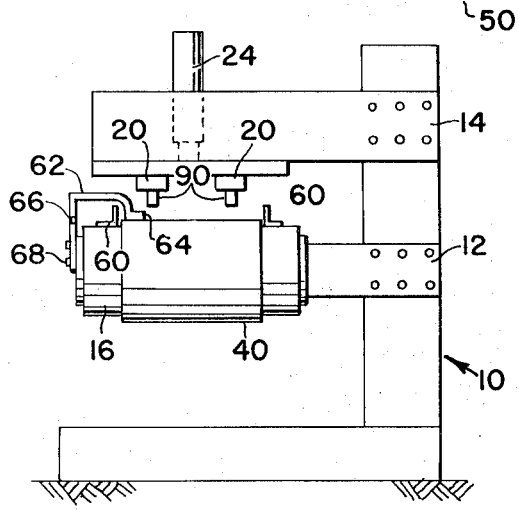
FIG. 2 is a side elevation of the machine of FIG. 1.

It can be clearly noted from FIGS. 1 and 2 that an endless rubber belt 40 is positioned around the rollers 16 and 18 so that it is in position with respect to the punch bed 12. One of the requirements of the invention is that the rubber belt or sheet actually be under a certain amount of tension when the punching takes place, and to this end the invention contemplates that arms 16a supporting roller 16 or each end thereof are slidably mounted in relation to the punch bed 12 by appropriate fixed slide bars 42 which cooperate in any suitable tongue and grooved relation for example with the arms 16a on each side of the punch bed 12. Then, to effect a lateral horizontal movement of roll 16, an appropriate air cylinder 44 driving a ram 46 is connected to the arms 16a and upon appropriate actuation by a foot pedal 48, for example controlling an air supply 50, the lateral horizontal position of roller 16 can be appropriately controlled to put the belt 40 under a selected amount of tension.

In the particular embodiment of the invention the apparatus was designed to effect punching of a rubberized wire reinforced rubber belt for snow mobiles where the holes were required to be in precision relation to each other so that a sprocket drive could be utilized to effect movement of the belt in the snow mobile configuration. Hence, FIG. 3 more completely illustrates the physical appearance of the belt 40, and this in effect comprising a pattern of squares defined by raised ribs 40a extending both laterally and logitudinally with respect to the belt configuration to provide a traction relationship with snow, mud, or other readily deformablee medium. In order to accomplish the sprocket drive, the holes provided by the invention and illustrated by numeral 41 are substantially square and positioned centrally and in aligned relation in the squares 41a defined by certain of the ribs 40a.

In order to insure a transverse alignment of the belt or sheet 40 with respect to the punch head 20 the invention contemplates that suitable lateral guides 60 as best seen in FIG. 2 might be provided, and which naturally can be adjustable to any desired sheet width, but which preferably will extend longitudinally substantially the full length of the punch bed 12.

Also, in order to achieve some initial longitudinal position of the sheet 40 with respect to the punch bed 12, and as particularly adapted to the punching of the sprocket holes in the snow mobile belt, the invention incorporates a guide 62 having a head 64 of a size to engage into the square holes along one lateral edge defined by the ribs 40a of the belt 40. This arm and head 64 are best seen in FIG. 2. The arm 62 is pivotally mounted by pin 66 to a fixed plate 68 mounted to the punch bed 12. Hence, the arm 62 can be swung up the belt 40 advanced, and then swung down to simply reposition the belt for each punching operation. Initial alignment of the belt to a particular relationship with the punch head 20 is thus assured by this longitudinal guide control. However, it should be understood that any other suitable longitudinal positioning structure will meet the objects of the invention.

The problem sought to be overcome by the invention is perhaps more clearly understood by an understanding of the material which is being punched. This is best illustrated in FIG. 8 which shows that the belt 40 is made up of a plurality of longitudinally extending wires 70 which may comprise single wires or a plurality of smaller wires making up each individual group. The wires are arranged in two layers and fully embedded and surrounded by a rubber matrix 72. Further, two cloth layers 74 and 76 are likewise embedded between the wire layers. While this particular design is for a snow mobile belt, numerous conveyor belts, or other type of rubberized sheet utilize the wire reinforcement either along or in conjunction with some cloth reinforcement as well, and this type of configuration is particularly used where the wires will normally be under tension in their operation environment.

In the particular snow mobile belt or tread, the thickness of the belt, exclusive of the raised ribs for traction purposes, is about three-eighths inches, and the invention contemplates that the method and apparatus of the invention are really only applicable to a relatively thick wire reinforced sheet and hence are applicable to a thickness having the range between one-eighth to 1 inch. In other words, the invention is applicable to that type of rubber sheet having sufficient thickness so that the wires themselves in effect are suspended and have no firm base against which cutting or shearing can take place, and where the thickness of the rubber itself is such that it tends to buckle and deform in a random manner because of its very thickness as the pressure of a punch or the like is brought to bear there against. The invention is also applicable really only to that type of rubber where it does have sufficient resilience and deformability, such as for example the hardness of a rubber in a pneumatic tire, or the like, rather than a very solid rubber where punching would be similar to punching through metal, or the like.

The invention contemplates then that the wire in the rubber belt should be under tension during the punching operation, and to this end the belt is stretched by actuating cylinder 44. In the instance of a 24 inch wide 120 inch long endless snow mobile belt, a tension of 1,000 psi to 1,500 psi has been found best, which effects a stretch of approximately one half of one percent of the length of the belt, or stretching of approximately 0.600 inches under this specific circumstance. This stretching places the wires 70 under a tension which is less than their elastic yield point, but which does hold them taunt during the punching operation. The figures given above are applicable to an approximate three-eighths inch thick wire reinforced rubberized belt as shown in FIG. 8, but naturally can and should vary depending upon the particular quality and characteristics of the belt and wire reinforcement associated therewith. Naturally, as the belt is stretched, the rubber itself is also placed under tension and this likewise is less than the yield tension or failure tension of the rubber, as well.

Figure 5:
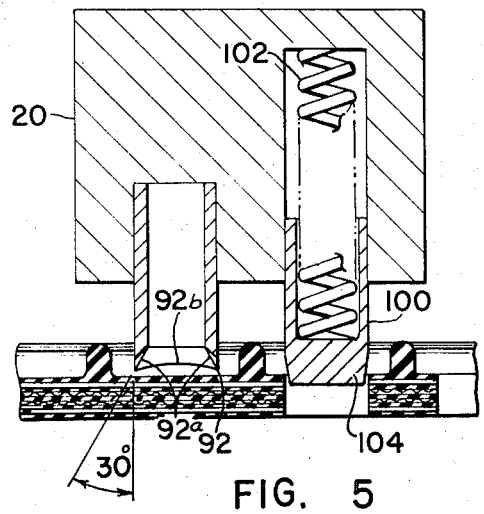
FIG. 5 is an enlarged cross sectional view of the cutter and alignment head.
Figure 4:
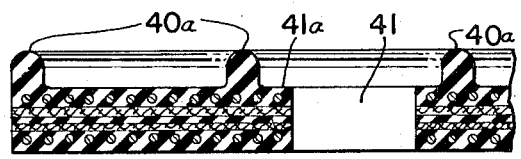
FIG. 4 is an enlarged broken away cross sectional view of the belt taken on line 4—4 of FIG. 3.

With the belt appropriately under tension the punching of the hole therethrough can conveniently take place. The invention accomplishes this by the use of a pair of cutter punches 90 carried by the cutter blocks 20, as best seen in FIG. 5. The cutter punch 90 is a tubular member fixedly mounted in the cutter head 20. For the particular punching operation with the snow mobile belt, a wall thickness of between one-eight to three-sixteenths inches of high alloy steel is suitable. The cutter punch 90 has a cutting edge 92 formed to define a substantially square external circumference, and beveled back on each of the four inside surfaces 92a to an approximate 30° angle as illustrated in FIG. 5. The 30° angle appears to be best for wear of the cutting edge and elimination of rubber compression to give a truer whole size. However, the invention contemplates that any angle between about 15° to about 45° will also suitably meet the objects of the invention. An important further aspect of the cutter edge 92 is that it is bowed as at 92b between corners. This bowed or curved cutting edge means that the corners or substantially opposite or opposed points hit the rubber first and start cutting with a gradual shear action towards the center of the cutting edge from each corner. In other words, the cutting edge is designed to contact the sheet at at least two points, preferably opposed, and effect a shearing cutting action in the sheet of the cutting edges towards the center or toward the other initial contact points as the punch moves through the sheet. This gradual shearing action with the rubber under tension, and with the wires under tension, provides the improved cutting action insuring a smooth cut surface to the rubber sheet, and a substantially true hole size as it does not place the entire hole being cut under a compressive and buckling force due to the resilience of the rubber.

Figure 3:
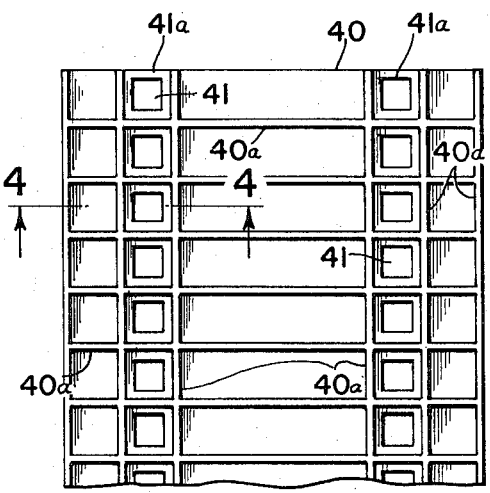
FIG. 3 is an enlarged partially broken away plan view of the belt associated with the machine showing the location of the holes being puched therein.

In order to provide precise alignment between adjacent successive holes, the punch block 20 further includes a resiliently mounted guide pin 100 carrying helical spring 102 that guides down into each previously punched hole due to the tapered end portion 104 so as to exactly center and space adjacent holes with respect to each other. The resilient mounting of guide pin 100 is necessary normally only for the first punching when no guiding action is necessary as there is no hole in which to guide. Hence, with the combination of the longitudinal guide head 64 with the guide pin 100, an exact longitudinal alignment of the belt is assured for each successive punch so that the holes 41 might fall in exact alignment for the sprocket drive as shown in FIG. 3 of the drawings.

A further feature of the invention is that the rubber belt is supported around the external periphery of the hole being punched. This is shown in FIGS. 6 and 7 which illustrate that the punch bed 12 has a hole 110 that receives punch cutter 90 after it penetrates through the sheet 40. Preferably, there will be between 0.001 and 0.0015 inches clearance from the outer periphery of the punch cutter 90 to the sides of hole 110, thus providing a full and good support around the outside periphery of the hole during the punching cut. FIGS. 6 and 7 likewise illustrate the curved cutting surface 92b, and in FIG. 7 illustrates how the cutting takes place by the cutting edge hitting the corners first and progressively cutting with the gradual shear action towards the center of the cutting edge from each corner.

In order to further enhance the cutting action during the punch, it is contemplated that the cutter punch actually moves through the rubber belt with a relatively show powerful stroke. Hence, to this end, in the embodiment of the invention illustrated the piston 24 is preferably five-eighths inches in diameter with a 3 inch cutting stroke. The pump 32 is initially operated at high volume such as 19 gallons per minute to move the cutter punch down to the belt rapidly, such as at a rate of about 3 inches per second. Just before the cutter punch hits the belt, through appropriate control to be defined hereinafter, the hydraulic pump is switched to a low volume, such as about 7 gallons per minute, to drive the punch through the belt in a slow speed combination with high power. Hence, the low speed drive is approximately between one-half inch to 1 ½ inches per second, and punching takes place at between 5,000 to 20,000 pounds per square inch at the punching head but preferably at about 10,000 psi.

In a machine operation of this type, a suitable foot pedal control 120 could provide manual actuation to the valve 30, such as is shown in FIG. 1 to initiate the actual punching operation once the machine operator has the belt properly positioned laterally and longitudinally, under tension, and wants to effect the punch.

ELECTRICAL CONTROL

FIGS. 9 and 10 illustrate the electrical schematic. With reference to FIG. 10, microswitches labeled with circles 1, 2, and 3 are mounted to the punch guide head 14 and cooperate with an actuator 130 mounted in fixed relationship to the punch heads 20. Naturally, as the punch heads 20 are movable up and down in the direction of the double ended arrow 132 the actuator arm 130 will contact respective ones of the microswitches 1, 2, and 3. Each of the switches 1, 2, and 3 are either normally opened or normally closed, as is evident in the schematic of FIG. 9.

Now, with reference to FIG. 9 a power supply is provided between lines 150 and 152 in the conventional manner. The foot pedal 120 is nothing more than a switch cooperating with relay coil 154 to close normally open switches 156 as indicated by dotted line 158 to thereby actuate a solenoid 160 which causes the control valve 30 to supply hydraulic fluid to the down line 26. It can be seen that once current is intially established to solenoid 160 through switches 156, normally closed switch 1 will allow current to continue to be supplied thereto even though switch 120 opens after the operator removes the actuation therefrom. Hence, the heads 20 continue in the downward direction till switch 2 is contacted which is normally open. The contacting of switch 2 actuates a relay coil 162 that closes switches 164. The closing of switches 164 actuates a solenoid 166 that actuates valve 30 to begin to supply fluid through line 28 to cause the ram 22 to move in the up direction. It should be noted that switch 1 is slightly below switch 2 and is not actuated until slightly after switch 2 closes to actuate solenoid 166. Hence, with the slight delay in switch 1, the transition from downward movement to upward movement of head 20 is more smoothly applied. The momentary opening of normally closed switch 1, however, breaks the power supply to solenoid 160, and likewise causes switches 156 to drop out so that the system will be ready for the next cycle. Even though switch 2 again opens to its normally open position as heads 20 start back in the up direction, normally closed switch 3 again completes the circuit until the arm 130 opens this switch thereby holding the head 20 in the upright position until switch 120 is again actuated by the operator.

METHOD OF THE INVENTION

The method of the invention is set forth in the steps of FIG. 11, and comprises stretching the wire reinforced rubber belt until all wires thereof are under tension, but under tension to less than their elastic yield limit. The hole is punch cut with a slow even powerful stroke starting the cut at at least two points on the periphery of the hole, and preferably opposite, or if more than two points are used, then equally spaced, and then working towards each other with a slow shearing cutting action. The rubber belt is supported around the outer periphery of the hole during the punch cut, and the final step is of course to remove the punch. It might also be added that holding the belt under tension assists in removing the cutter punch as it does not tend to stick or cling to the sides of the hole after punching is completed.

Hence, it is seen and should be understood that the invention is applicable to punching holes by a shearing cutting action through a tensioned wire reinforced rubber or rubberized fabric belt or sheet having at least sufficient thickness so that the wires tend to be in a free floating condition in the rubber, and the rubber would normally tend to compress or buckle under normal punching operations. This method would be applicable to many other rubberized sheets, whether endless or not, and it has been defined with respect to a snow mobile belt to define an operable embodiment as required by the Patent Statutes. The scope of the invention is intended to be described by the appended claims, and should be construed in accordance therewith.

What is claimed is:

1. A method to punch precision aligned holes in longitudinally extending wire reinforced rubber sheets which comprises the steps of
   a. placing the wire reinforced rubber sheets about a pair of rolls,
   b. actuating a ram to effect lateral horizontal movement of said rolls to place said sheet under a selected amount of tension,
   c. punching a cutting tool through the sheet under tension with a high pressure and a relatively low speed;
   d. effecting the cutting through the sheet during the punching of the cutting tool by a shearing action caused by beginning the cutting at at least two separated points and progressively working the cutting from said points toward each other; and
   e. supporting the sheet around the periphery of the hole during the punching of the hole therethrough.

2. A method according to claim 1 where the tensioning of the wires is to just less than their yield point.

3. A method according to claim 1 where the rubber sheet is at least three-eighths inch thick and the wires are suspended in the sheet, and includes providing a cutting pressure to the cutting of at least 5,000 psi, and a cutting speed through the sheet of at least one-half inch per second.

* * * * *